United States Patent
Alattar et al.

(10) Patent No.: US 9,898,792 B2
(45) Date of Patent: Feb. 20, 2018

(54) HIERARCHICAL WATERMARK DETECTOR

(71) Applicant: Digimarc Corporation, Beaverton, OR (US)

(72) Inventors: Osama M. Alattar, Tigard, OR (US); Adnan M. Alattar, Tigard, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 15/232,388

(22) Filed: Aug. 9, 2016

(65) Prior Publication Data

US 2017/0039669 A1    Feb. 9, 2017

Related U.S. Application Data

(63) Continuation of application No. 14/546,708, filed on Nov. 18, 2014, now Pat. No. 9,412,144, which is a continuation of application No. 11/228,033, filed on Sep. 14, 2005, now Pat. No. 8,891,811.

(60) Provisional application No. 60/610,823, filed on Sep. 17, 2004.

(51) Int. Cl.
   *G06K 9/00* (2006.01)
   *G06T 1/00* (2006.01)
   *H04N 1/32* (2006.01)

(52) U.S. Cl.
   CPC .......... *G06T 1/005* (2013.01); *G06K 9/00744* (2013.01); *H04N 1/32203* (2013.01); *H04N 1/32267* (2013.01); *H04N 1/32288* (2013.01); *H04N 1/32352* (2013.01); *G06T 2201/0051* (2013.01); *G06T 2201/0061* (2013.01); *G06T 2201/0065* (2013.01)

(58) Field of Classification Search
   None
   See application file for complete search history.

(56) References Cited

U.S. PATENT DOCUMENTS

| | | |
|---|---|---|
| 4,837,422 A | 6/1989 | Dethloff et al. |
| 5,319,735 A | 6/1994 | Preuss et al. |
| 5,337,361 A | 8/1994 | Wang et al. |

(Continued)

OTHER PUBLICATIONS

US. Appl. No. 60/610,823, filed Sep. 17, 2004.

(Continued)

*Primary Examiner* — Hadi Akhavannik
(74) *Attorney, Agent, or Firm* — Digimarc Corporation (57) ABSTRACT

The present invention relates generally to digital watermarking. One aspect of the disclosure includes a method comprising: obtaining data representing imagery; using one or more configured processors, analyzing a plurality of portions of the data to detect a watermark orientation component, said analyzing employing a match filter, in which the match filter yields a correlation value for each of the plurality of portions; determining a first portion from the plurality of portions that comprises a correlation value meeting a predetermined value; and directing a watermark decoder at the first portion to decode a plural-bit watermark payload, in which the watermark decoder produces a watermark signature for the first portion, and in which the watermark decoder searches a plurality of areas at or around the first portion to decode the plural-bit watermark payload. Of course, many other aspects and disclosure are provided in this patent document.

20 Claims, 5 Drawing Sheets

| Signature | Scale Factor | Rotation Angle | Shift Factor | Detection Value |
|---|---|---|---|---|
| Signature #1 | Scale #1 | Angle #1 | Shift #1 | DV #1 |
| Signature #2 | Scale #2 | Angle #2 | Shift #2 | DV #2 |
| Signature #3 | Scale #3 | Angle #3 | Shift #3 | DV #3 |
| Signature | Scale #4 | Angle #4 | Shift #4 | DV #4 |
| Signature #5 | Scale #5 | Angle #5 | Shift #5 | DV #5 |

(56) References Cited

U.S. PATENT DOCUMENTS

| | | | |
|---|---|---|---|
| 5,379,344 | A | 1/1995 | Larsson et al. |
| 5,499,293 | A | 3/1996 | Behram et al. |
| 5,613,004 | A | 3/1997 | Cooperman et al. |
| 5,659,726 | A | 8/1997 | Sandford, II et al. |
| 5,663,766 | A | 9/1997 | Sizer, II |
| 5,664,018 | A | 9/1997 | Leighton |
| 5,687,236 | A | 11/1997 | Moskowitz et al. |
| 5,721,788 | A | 2/1998 | Powell |
| 5,790,662 | A | 8/1998 | Valerij et al. |
| 5,799,092 | A | 8/1998 | Kristol et al. |
| 5,835,639 | A | 11/1998 | Honsinger et al. |
| 5,848,155 | A | 12/1998 | Cox et al. |
| 5,859,920 | A | 1/1999 | Daly et al. |
| 5,949,055 | A | 9/1999 | Fleet et al. |
| 5,960,081 | A | 9/1999 | Vynne et al. |
| 6,031,914 | A | 2/2000 | Tewfik et al. |
| 6,069,914 | A | 5/2000 | Cox et al. |
| 6,122,403 | A | 9/2000 | Rhoads |
| 6,268,058 | B1 | 7/2001 | Tahon et al. |
| 6,285,776 | B1 | 9/2001 | Rhoads |
| 6,314,192 | B1 | 11/2001 | Chen |
| 6,343,138 | B1 | 1/2002 | Rhoads |
| 6,389,421 | B1 | 5/2002 | Hawkins et al. |
| 6,411,392 | B1 | 6/2002 | Bender et al. |
| 6,556,689 | B1 | 4/2003 | Xia et al. |
| 6,611,830 | B2 | 8/2003 | Shinoda |
| 6,614,914 | B1 | 9/2003 | Rhoads et al. |
| 6,947,571 | B1 | 9/2005 | Rhoads et al. |
| 6,952,485 | B1 | 10/2005 | Davidson et al. |
| 6,965,682 | B1 | 11/2005 | Davis et al. |
| 6,975,745 | B2 | 12/2005 | Bradley |
| 7,013,021 | B2 | 3/2006 | Gustafson |
| 7,116,781 | B2 | 10/2006 | Rhoads |
| 7,142,689 | B2 | 11/2006 | Hayashi et al. |
| 8,891,144 | B2 | 11/2014 | Alattar et al. |
| 9,412,144 | B2 | 8/2016 | Alattar et al. |
| 2001/0030759 | A1 | 10/2001 | Hayashi et al. |
| 2002/0114491 | A1 | 8/2002 | Sharma et al. |
| 2002/0120849 | A1 | 8/2002 | McKinley et al. |
| 2002/0157005 | A1* | 10/2002 | Brunk ............ G06Q 20/401 713/176 |
| 2002/0159614 | A1* | 10/2002 | Bradley ............ G06T 1/0021 382/100 |
| 2002/0184503 | A1* | 12/2002 | Kalker ............ G06T 1/0028 713/176 |
| 2003/0072467 | A1* | 4/2003 | Brundage ............ G06T 1/005 382/100 |
| 2003/0128861 | A1 | 7/2003 | Rhoads |
| 2003/0177359 | A1* | 9/2003 | Bradley ............ G06T 1/0064 713/172 |
| 2003/0204718 | A1 | 10/2003 | Connelly |
| 2003/0223584 | A1* | 12/2003 | Bradley ............ G06T 1/0028 380/229 |
| 2004/0181671 | A1 | 9/2004 | Brundage et al. |
| 2004/0263911 | A1* | 12/2004 | Rodriguez ............ G07D 7/0034 358/3.28 |

OTHER PUBLICATIONS

Jul. 7, 2008 Appeal Brief; Dec. 4, 2007 final Office Action; and Sep. 26, 2007 Amendment; all from assignee's U.S. Appl. No. 10/053,488 (published as US 2002-0120849 A1).

Jul. 28, 2008 Notice of Appeal; Feb. 28, 2008 final Office Action; Feb. 8, 2008 Supplemental Amendment; and Nov. 19, 2007 Amendment; all from assignee's U.S. Appl. No. 10/686,495 (published as US 2004-0181671A1).

Sep. 8, 2008 Notice of Allowance; May 1, 2008 Amendment; Nov. 1, non-final Office Action; Sep. 18, 2007 Amendment with RCE; May 18, 2007 final Office Action; all from assignee's U.S. Appl. No. 10/274,290 (published as US 2003-0128861 A1).

Bender, "Techniques for Data Hiding," SPIE vol. 2420, pp. 164-173, 1995.

A. Reed, et al., "Color Image Appearance Model Applied to Printing of Watermarked Images," Proc. Of the ICASSP, pp. 89-92 May 2004.

O'Ruanaidh, "Rotation, Scale and Translation Invariant Digital Image Watermarking," Signal Processing, pp. 2-15, May 1, 1998.

O'Runanaidh, "Rotation, Scale and Translation Invariant Digital Image Watermarking," 1997 IEEE, pp. 536-539.

Sheng, "Experiments on Pattern Recognition Using Invariant Fourier-Mellin Descriptors," Journal of Optical Society of America, vol. 3, No. 6, pp. 771-776, 1986.

Koch et al., "Copyright Protection for multimedia Data," Fraunhofer Institute for Computer Graphics, Dec. 16. 1994, 15 pages.

"Access Control and Copyright Protection for Images, WorkPackage 8: Watermarking," Jun. 30, 1995, 46 pages.

Matsui et al., "Video-Steganography: How to Secretly Embed a Signature in a Picture," IMA Intellectual Property Project Proceedings, Jan. 1994, vol. 1, Issue 1, pp. 187-205.

\* cited by examiner

| Signature | Scale Factor | Rotation Angle | Shift Factor | Detection Value |
|---|---|---|---|---|
| Signature #1 | Scale #1 | Angle #1 | Shift #1 | DV #1 |
| Signature #2 | Scale #2 | Angle #2 | Shift #2 | DV #2 |
| Signature #3 | Scale #3 | Angle #3 | Shift #3 | DV #3 |
| Signature | Scale #4 | Angle #4 | Shift #4 | DV #4 |
| Signature #5 | Scale #5 | Angle #5 | Shift #5 | DV #5 |

HIERARCHICAL WATERMARK DETECTOR

RELATED APPLICATION DATA

This application is a continuation of application Ser. No. 14/546,708 filed Nov. 18, 2014 (now U.S. Pat. No. 9,412,144) which is a continuation of application Ser. No. 11/228,033, filed Sep. 14, 2005 (now U.S. Pat. No. 8,891,811), which claims the benefit of U.S. Provisional Patent Application No. 60/610,823, filed Sep. 17, 2004. This application is also related to assignee's U.S. patent application Ser. No. 09/659,125, filed Sep. 11, 2000 (now U.S. Pat. No. 6,952,485); Ser. No. 10/053,488, filed Nov. 2, 2001 (published as US 2002-0120849 A1; issued as U.S. Pat. No. 8,355,525); Ser. No. 09/945,244, filed Aug. 31, 2001 (published as US 2002-0057823 A1; issued as U.S. Pat. No. 7,013,021); Ser. No. 10/686,495, filed Oct. 14, 2003 (published as US 2004-0181671 A1); and Ser. No. 10/033,363, filed Oct. 25, 2001 (published as US 2003-0081810 A1; issued as U.S. Pat. No. 6,975,745). Each of the above patent documents is hereby incorporated by reference.

TECHNICAL FIELD

The invention relates to digital watermarking, and specifically relates to methods for digital watermark detection and reading. In one implementation, we provide a hierarchical watermark detecting method and detector apparatus.

BACKGROUND AND SUMMARY

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 6,122,403 and 6,614,914, which are hereby incorporated by reference.

Integrating a hardware watermark reader in imaging devices (cameras, scanners, printers, fax machines, copiers) cellular phones, PDA devices may soon be necessary. Currently, most of these devices have no digital rights management (DRM) and hence can freely download music, video, and pictures from the Internet. An integrated watermark reader not only would enforce DRM in these devices, but also it would enable new applications. Such applications may potentially change the usage habit and pattern of these devices. For example, the imaging device integrated in most of these devices could be used with a watermarked advertisement and a built-in global positioning system (GPS) to guide the user to the nearest store where the advertised goods are currently available or on sale.

Low-cost stand-alone watermark readers will also be developed soon to harness the power of the millions of watermark-enhanced identity cards already deployed in the USA and around the world. These readers will be essential in enforcing the law and reducing identity thefts. Also, the ubiquitous deployment of these readers will enable and empower a new wave of applications.

Cellular phones and PDA devices, however, have some limitations when used with sophisticated watermark detectors operating on large images. These limitations include the type and speed of the processor used in these devices, the amount of available memory, the system bandwidth, and the operating system controlling these devices.

Usually, cellular phones and PDA devices employ fixed-point processors such as Intel's StrongARM or XScale processors, which have a clock speed in the 100-400 MHz range. This speed is only a fraction of the speed of mainstream processors typically found in PCs. This speed limits the amount of computations and their precision, which the watermark detector is allowed to perform.

These devices also have limited DRAM and system bandwidth. Currently, PDA devices have 32 MB of memory, but cellular phones have about 6 MB only. About half of the memory available on cellular phones is used by the operating system. Also, most of these devices have about 20 MHz of system bandwidth. The low bandwidth combined with the lack of memory can be a major bottleneck for real-time detection of the watermarks embedded in large images via cellular phones and PDA devices.

Moreover, these devices use either a primitive native operating system such as MS SmartPhone, Symbian, and Brew, or a Java-based operating system such as Doja or J2ME. Although native operating systems allow the execution of a watermark detector written in a compiled language such as C, Java-based operating systems require Java implementations of the detector. Such an implementation is not as efficient as a C implementation, especially for sophisticated signal processing algorithms such as watermark detectors.

Although a watermark detector can be implemented in a customized chip, the cost of implementing a complex algorithm can be prohibitive. A field programmable gate array (FPGA) or application-specific integrated circuit (ASIC) can be used for this purpose. Such a chip can be integrated with the cellular phone, PDA device, or stand-alone watermark reader. However, complex watermarking algorithms may require a large number of gates and excessive on-chip memory and system bandwidth, which tremendously increases the cost of this dedicated chip. This cost, however, can be reduced substantially by reducing the data that the watermark detector operates on and the computations it performs on this data.

This document describes a block-based watermark detector and reader that use a hierarchical search strategy to quickly zoom into the image region with the strongest watermark. This approach reduces the computations and the amount of data the detector operates on, which, in turn, reduces the processor speed, the memory, and the bandwidth requirement of the detector. This design makes the detector suitable for the aforementioned real-time software and low-cost hardware implementations.

Further features and combinations will become even more apparent with reference to the following detailed description and accompanying drawings.

DETAILED DESCRIPTION

In this document, we describe a digital watermark method for real-time software or low-cost hardware implementation. The developed detector is suitable for devices such as stand-alone watermark readers, cellular phones, music or video players, PDAs, image processing equipment (like cameras, scanners, fax machines, copiers, printers and multifunction devices), etc. These devices have primitive operating systems with limited processing power, memory, and system bandwidth. Our embedder tiles the watermark over the host image to let the watermark be detected from any region in the digital or printed watermarked image as the data is streamed through the device. It also adapts the watermark strength locally to maximize detection and minimize watermark visibility. Consequently, the watermark may be detectable only in few regions of the image that are not necessarily aligned with the original tile boundaries. To avoid a brute-force search, our detector uses a hierarchical search algorithm to quickly zoom into the region with the strongest watermark. This approach permits a real-time software implementation of the detector and reduces the necessary gate count, on-chip memory, and system bandwidth for a hardware implementation. Software simulation results of the developed algorithm indicate that the algorithm is very efficient and the detection results are very comparable to those obtained using the brute-force search.

Digital Watermark Embedder

One embodiment of our embedder uses an embedding scheme that tiles the watermark over the host image. This distribution lets the watermark be detected from a small region in the digital or printed watermarked image. A preferred embedder embeds in each of these tiles (128×128 pixels) a watermark signal that carries a payload and a reference signal (or orientation component) that is used for synchronization. The watermark signal is preferably the same in all the tiles, and we use, e.g., a 70-bit payload. Of course, a different sized payload can be used as well. We also prefer to use spread-spectrum techniques and convolutional error correction codes to combat noise and maximize robustness. Specific methods for implementing such a watermark embedder are provided in U.S. Pat. No. 6,614,914, which is incorporated above.

The reference signal can include, e.g., characteristics in an FFT or other domain, which the watermark reader uses to determine the image's original origin, scale, and orientation after the image is cropped, scaled, or rotated. Hence, this reference signal adds resiliency to the watermark against image cropping, scaling, and rotation.

To maximize detection and minimize watermark visibility, our watermark embedder may adapt watermark strength according to the local characteristics of the host image and the properties of the human vision system. See, for example, A. Reed and E. Rogers, "Color Image Appearance Model Applied to Printing of Watermarked Images", Proc. of the ICASSP, pp 89-92, Montreal, Canada, May 2004, which is hereby incorporated by reference. This adaptation, however, causes variability in the watermark strength within each tile and from one tile to another. Consequently, the regions with the strongest watermark may not necessarily be aligned with the original tile boundaries. Moreover, when visibility of the watermark is a major concern, the embedder may reduce the strength of the watermark to the point that the watermark becomes detectable only in a few regions.

In the next section, we describe a block-based hierarchical detector, which allows real-time implementation of the detector in cellular phones, PDA devices, video and game players and imaging devices (cameras, scanners, printers, copiers, fax machines, etc). It also allows low-cost hardware implementation of the detector in stand-alone watermark readers.

Hierarchical Watermark Detector

During the reading process in one embodiment, a watermark reference signal is detected in, e.g., the FFT domain and is used to determine a rotation angle and shift and scale factors of an input image (or video) region. This determination can be achieved by comparing a detected signal with the reference signal. A log-polar mapping and a match filter are used to perform the comparison efficiently. The watermarked reader, then, uses the determined angle and scale factors to normalize the input image region, such that its orientation and size matches those of the corresponding region in the image when the image was embedded. Once the orientation and the size of the input region are normalized, the watermark reader can read the watermark from any tile within the input region where the watermark signal is strong. The location of this tile can be arbitrary and does not have to be aligned with the original tile when the image was embedded. To read the watermark correctly, the reader uses the shift factor to locate the origin of the watermark; it then can exploit the cyclic nature of the watermark tiles. A correlation detector is used to detect the watermark signal. Even more information on detector and reader implementations is provided in U.S. Pat. No. 6,614,914. A soft convolutional decoder is used to decode the payload. The correlation strengths of all the watermark bits are used as weights for the soft decoding. We refer to these weights in the rest of this paper as the watermark signature.

Brute-Force Search

A brute-force search can be used by the detector to detect an area in the image that contains a strong watermark. In this case, the detector starts by evaluating the presence of the watermark in a tile-sized region starting from the upper left corner of the input image region. If the detector does not detect a watermark, it continues by systematically shifting the location of the region to be evaluated horizontally and vertically by a small distance until the watermark is found.

Since the strength of the watermark signal varies across the watermarked image, the size of the vertical and horizontal shifts must be small to achieve the desired robustness levels, which, in turn makes the search space extremely large. In this case, the detection is computationally intensive and is prohibitive for some software or stand-alone hardware implementations. For software, the brute-force detection is slow, and for hardware it is expensive, since it usually requires high gate count, memory, and system bandwidth.

Hierarchical Search

Figure 1:
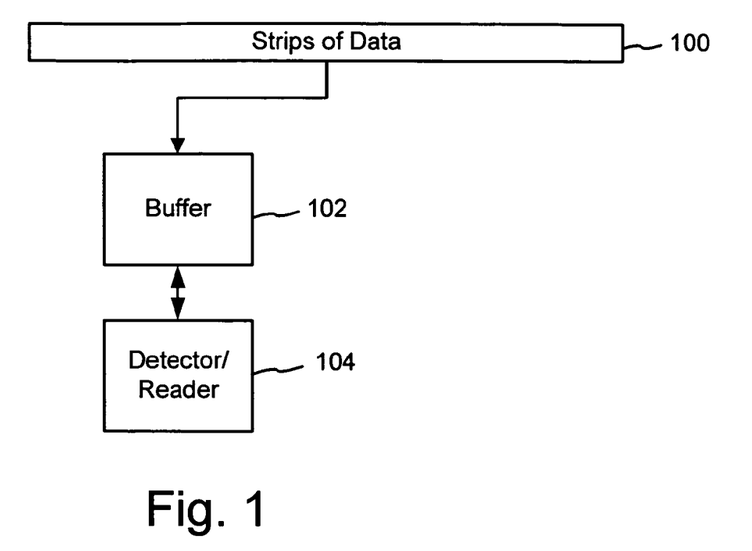
FIG. 1 is a block diagram illustrating a detector system.

To avoid a brute-force search, a preferred detector uses a hierarchical search strategy to quickly zoom into the image region with a strong (or strongest) watermark. FIG. 1 is a block diagram illustrating a detector system. As shown in FIG. 1, the detector 104 operates on image data that is acquired sequentially line-by-line, e.g., lines 100 (or data "strips") and collected in a buffer 102. The detector includes modules for detecting the digital watermark, and for reading a digital data message or payload carried in the detected digital watermark.

Figure 2:
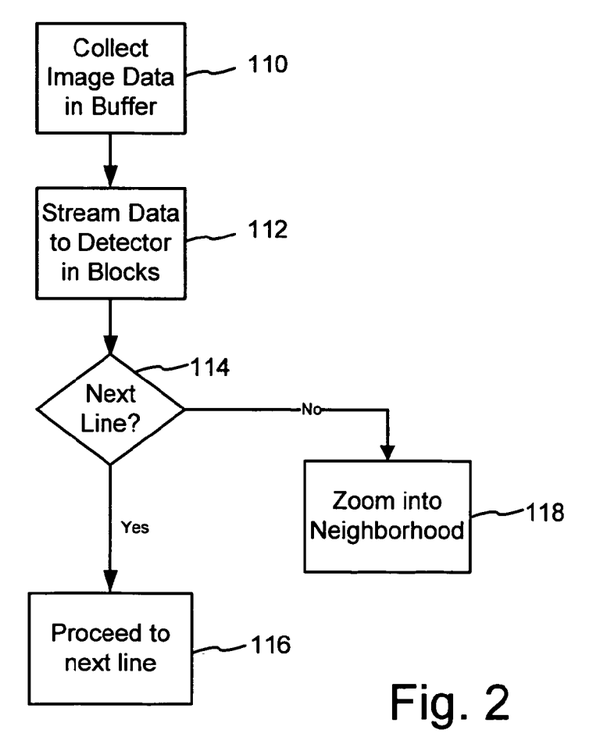
FIG. 2 is a flow diagram illustrating the operation of the detector system using a hierarchical search strategy.

FIG. 2 is a flow diagram illustrating the operation of the watermark detector 104 using a hierarchical search strategy. Once a sufficient number of data strips are acquired in the buffer (110), the data is streamed through the detector block by block (112).

Figure 5:
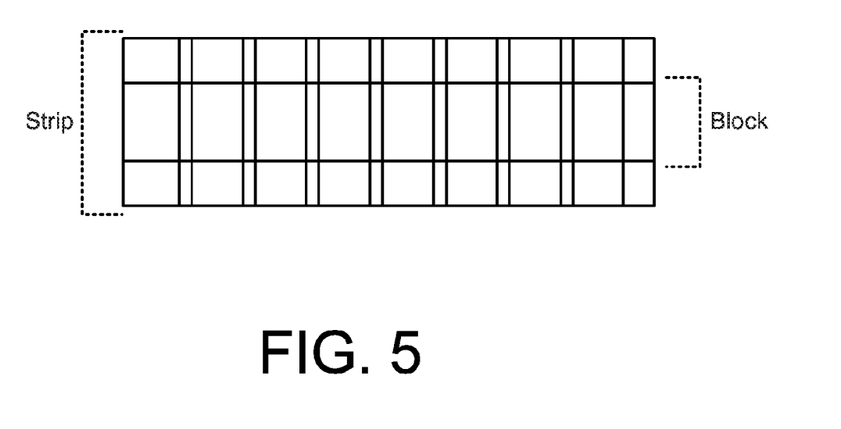
FIG. 5 is a diagram illustrating a portion of image data, called a strip, and a pattern of blocks that are evaluated in a hierarchical watermark search strategy.

Once the detector finishes processing a line of blocks, it decides whether to start processing the next line of blocks (114, 116) or to zoom into the neighborhood of one of the processed blocks in the current strip (118). The blocks in any line may overlap each other as depicted in FIG. 5. Similarly, the data strips may also overlap each other, and the height of each strip may be more than the height of one block as illustrated. However, the amount of overlap should always be minimized to reduce the data, the computation, and the required bandwidth. We also note that the height of a strip may be less than a height of a block. In these cases several data strips are used to generate blocks.

In one implementation, we chose to use 128×128 non-overlapping blocks and non-overlapping strips of height of 256 pixels. Of course, a strip height in the range of 64-320 may be suitably employed. These values were chosen empirically to maximize robustness and minimize bandwidth requirements. Of course, the strip values may be increased or decreased if the block size is respectfully increased (e.g., 256×256 blocks) or decreased (e.g., 32×32 blocks).

Figure 3:
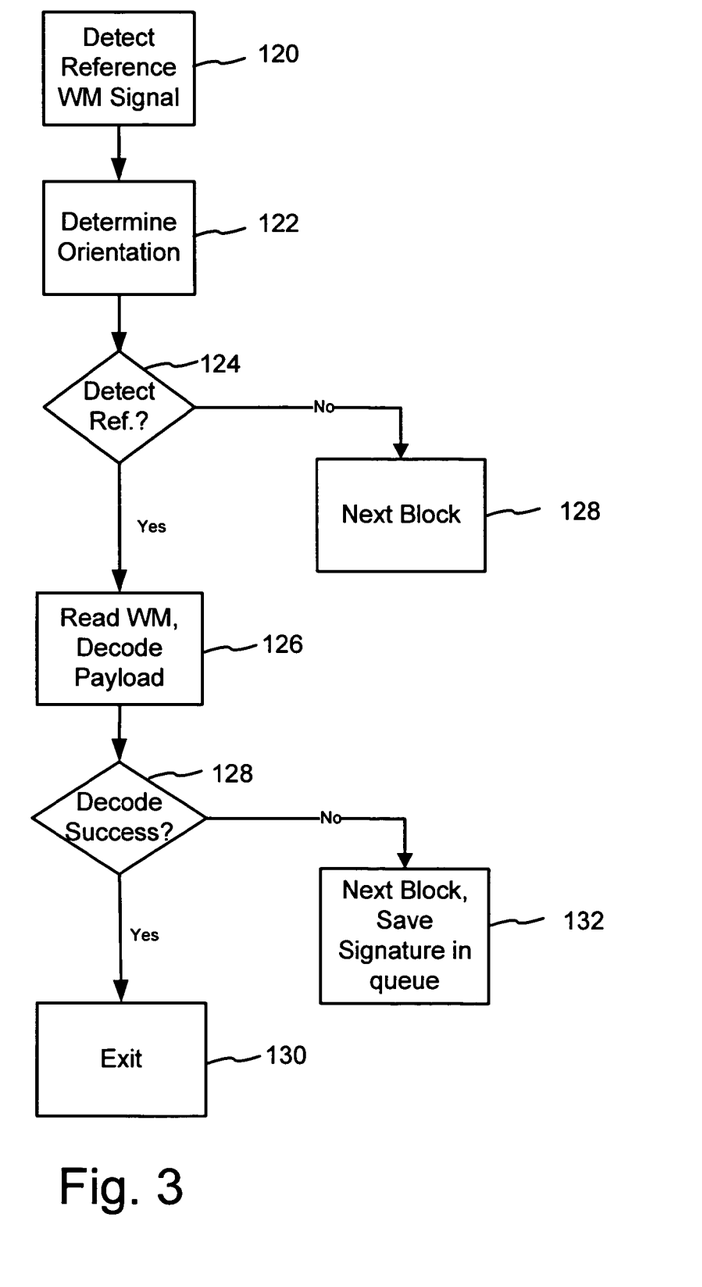
FIG. 3 is a flow diagram illustrating detector processing for blocks of an incoming signal in a hierarchical search strategy.

FIG. 3 is a flow diagram illustrating detector processing for each block. For each of the blocks in the current strip the watermark detector attempts to detect the reference signal (120) and determine the orientation angle and the scale and shift factors (122). If it finds the reference signal in any block with a high confidence (124), then the detector attempts to read the watermark signal and decode the payload (126). It uses the correlation value obtained from a match filter used in the process of detecting the reference signal as an indicator of watermark presence and strength. If the detector decodes the payload successfully (128), it terminates the process and exits (130); otherwise, it moves on to the next block in the current strip. If the reader attempts to read the watermark and fails, the detector preferably saves the resulting watermark signature in a queue that can be used for boosting the signal that could be found in subsequent blocks (132).

Figure 4:
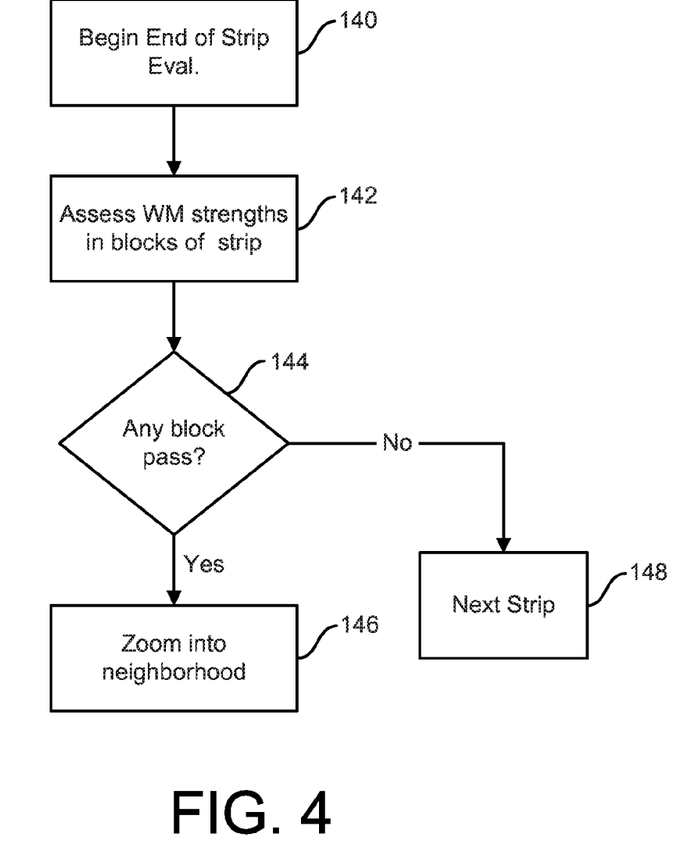
FIG. 4 illustrates a watermark detector process for re-evaluating a portion of signal if a successful watermark decode is not achieved for blocks in that portion.

FIG. 4 illustrates a process for evaluating a strip if a successful decode is not achieved for that strip. If the watermark detector was not successful in decoding the payload in any of the blocks in a strip, it again assesses the watermark strengths of all the blocks in the strip (140, 142). If the watermark strength in any one of these blocks is sufficiently high (144), it zooms into the area of that block (146). (Sufficiency can be determined before hand based on accepted tolerances relative to, e.g., processing time or acceptable false positive/false negative decode rates.) Then, the detector performs a fast and systematic search for the watermark in a neighborhood of the best block. Otherwise, the detector proceeds to the next strip (148).

Figure 6:
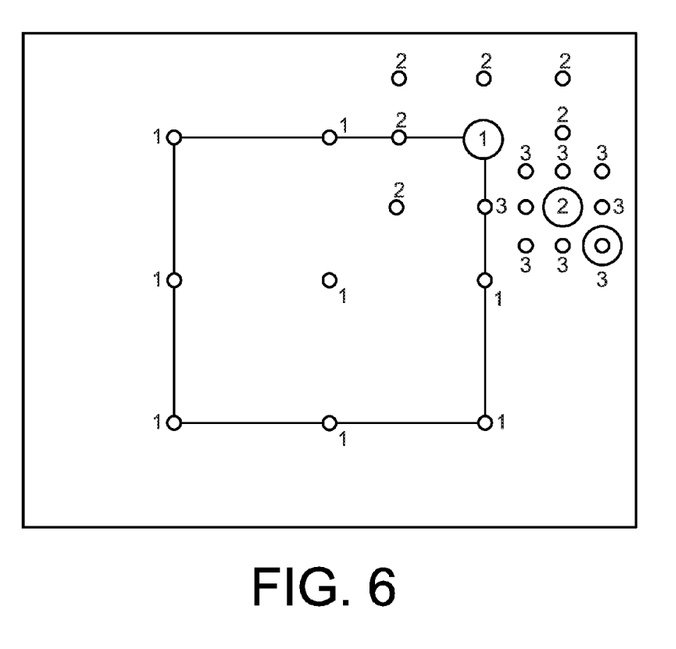
FIG. 6 depicts a three-step log search strategy in which the search is achieved in layers.

FIG. 6 depicts a three-step log search strategy in which the search is achieved in layers. Each of the dots in the figure indicates a center of a 128×128 block. The number associated with each block indicates the layer it belongs to. The blocks in a layer with lower numbers are evaluated first. The blocks in each layer are evaluated clockwise starting from the upper-left corner. The detector does not evaluate the center block in the current layer, since it has already evaluated that block when the detector evaluated the blocks of the previous layer.

The detector evaluates the blocks in each layer in a similar fashion to that used in evaluating the blocks in a strip. The detector attempts to detect the reference signal. If it finds the reference signal with a high confidence, then it attempts to read the watermark signal. If it decodes the payload successfully, it terminates the process and exits; otherwise, it moves on to the next block in the current layer. It also saves the watermark signature of any block it attempts to read. If the watermark detector was not successful in decoding the payload in any of the blocks in a layer, it again assesses the watermark strengths of all the blocks in that layer. If the watermark strength in any of these blocks is sufficiently high, it zooms into the area of the block with the highest watermark strength. In this case, it reduces the distances between the blocks in the search pattern by 50%. The iterations stop once the watermark is read or the number of iterations reaches a predefined maximum. A circle around a block location in FIG. 6 indicates the location of the best block in that layer.

Brute-Force Search Vs. Hierarchical Search

The detector method described above tremendously reduces the amount of data the watermark detector operates on and the amount of computations it performs. Using brute-force search on a W×H image (where W is image width in pixels and H is image height in pixels) would require processing a maximum of $$\frac{W}{M} \times \frac{H}{N}$$

blocks, where M and N are the horizontal and vertical shifts in pixels. To achieve a practically good robustness level, the values of M and N must be small. For W=320, H=240, and M=N=16, the blocks are overlapped by 112 pixels in both directions, and the maximum number of blocks that would be processed by the brute-force detector is about 300 blocks. Decreasing the block overlap would reduce the number of blocks to be processed, but this reduction causes a rapid decline in the robustness of the algorithm.

On the other hand, the hierarchical search would require the processing of a maximum of $$\frac{H}{128}\left(\frac{W}{128} + K \times L\right)$$

blocks, where L is the maximum number of layers allowed, and K is the number of block positions in the search pattern. For three layers and eight block positions in the search pattern, the maximum number of blocks that would be processed by the developed hierarchical approach is about 50 blocks, which is about 17% of the maximum number of blocks in the brute-force search with M=N=16, while maintaining an equivalent level of robustness.

Combining Signature

As mentioned before, to boost robustness, the detector shares statistics about the watermark signal between blocks. These statistics include the signature, the scale factor, the rotation angle, and the shift factor. In one embodiment, the signature is a sequence of 512 bits that represents the watermark in the block. Since the same watermark signal is embedded in all the blocks, a signature obtained from one block can be used to reinforce the detection in another block provided that both blocks have compatible scale factors and rotation angles. The detector uses the queue depicted in FIG. 7 to hold and manipulate the extracted signatures from the blocks. In our experiments, we used a queue of length equal to 9; however, this length can be adjusted according to environmental constraints.

Figure 7:
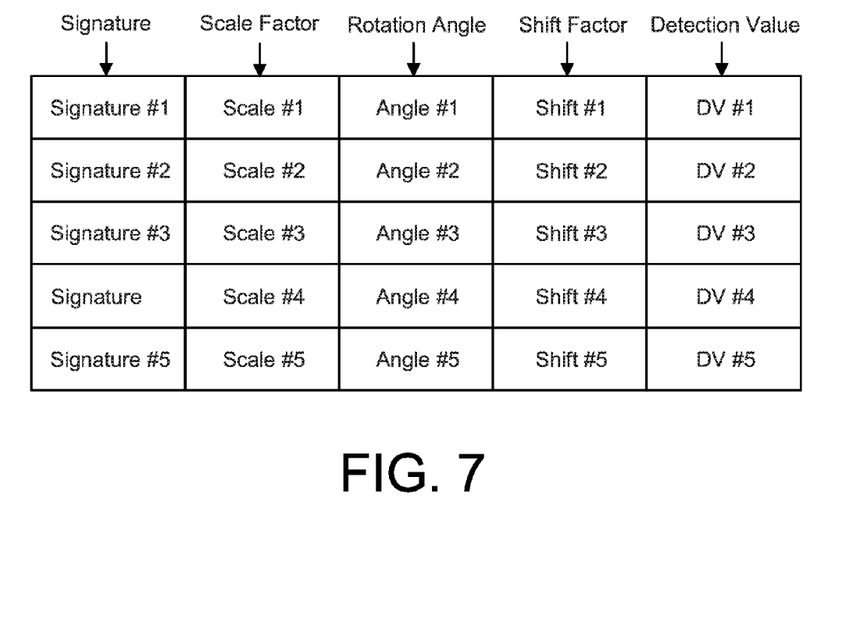
FIG. 7 illustrates an example of a queue used to accumulate partial watermark decoding results during a watermark search through blocks of a suspect signal.

The detector automatically adds the signature it extracts from a block to the signature queue. Then, the detector groups all the signatures in the queue according to their associated rotation angles and scale and shift factors. The detector then adds the signatures with compatible rotation angles and scale and shift factors and attempts to decode the payload from the accumulated signature. The detector uses a first-in-first-out strategy to update the queue, but other strategies can also be used.

Results

Hierarchical Approach Vs. Brute-Force Approach

We implemented the hierarchical block-based watermarking algorithm described above and tested it with 1,250 images of various sizes, scales, and orientations. We used non-overlapping blocks in each strip, and we used the search pattern shown in FIG. 6 to zoom into the neighborhood of the block with the strongest signal. We set the initial distance (horizontal or vertical) between any two adjacent blocks in the search pattern to 64 pixels. We varied the number of layers from one to three. We compared the results with those we obtained from the brute-force-based algorithm with various overlaps between blocks. All tested algorithms always ignored worthless (purely blank) blocks.

TABLE 1

| Algorithm | Avg. # Max Processed Blocks | Detection Rate |
| --- | --- | --- |
| Brute-force-based; 16 shift | 2,656 | 99.52% |
| Brute-force-based; 32 shift | 664 | 98.16% |
| Brute-force-based; 64 shift | 166 | 94.96% |
| Hierarchical, 1 layer, 8 nearest neighbor search pattern | 96 | 99.92% |
| Hierarchical, 2 layers, 8 nearest neighbor search pattern | 150 | 99.84% |
| Hierarchical, 3 layers, 8 nearest neighbor search pattern | 204 | 100.00% |

Table 1, which lists the results, indicates that we were able to achieve a slightly higher detection rate with the hierarchical detector than with the brute-force-based detector even when the brute-force-based algorithm used horizontal and vertical shifts of 16 pixels. The hierarchical detector always used much less data than the brute-force-based detector. When the hierarchical detector was restricted to one layer, it only used 3.6% of data used by the brute-force-based detector. This reduction is not only a major savings in processing time, but also a major savings in memory and bandwidth requirements.

Hierarchical Patterns with Different Search Patterns

Figure 8:
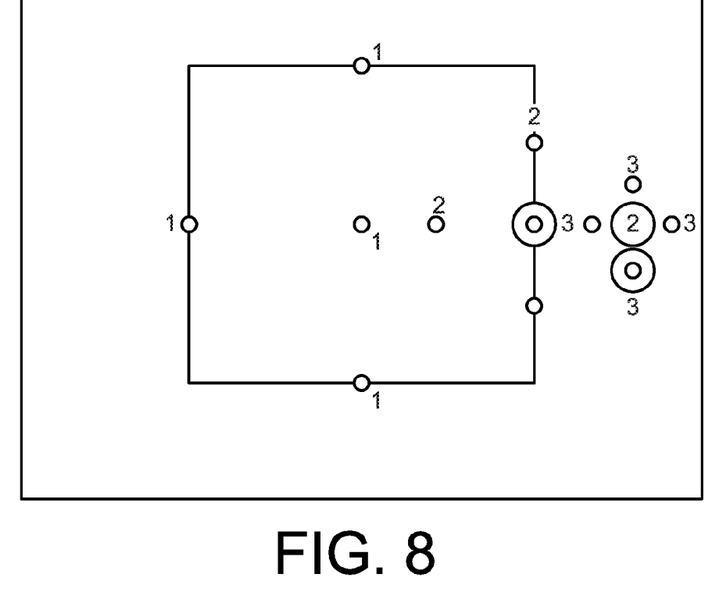
FIGS. 8 and 9 illustrate alternative search patterns in a watermark search strategy.
Figure 9:
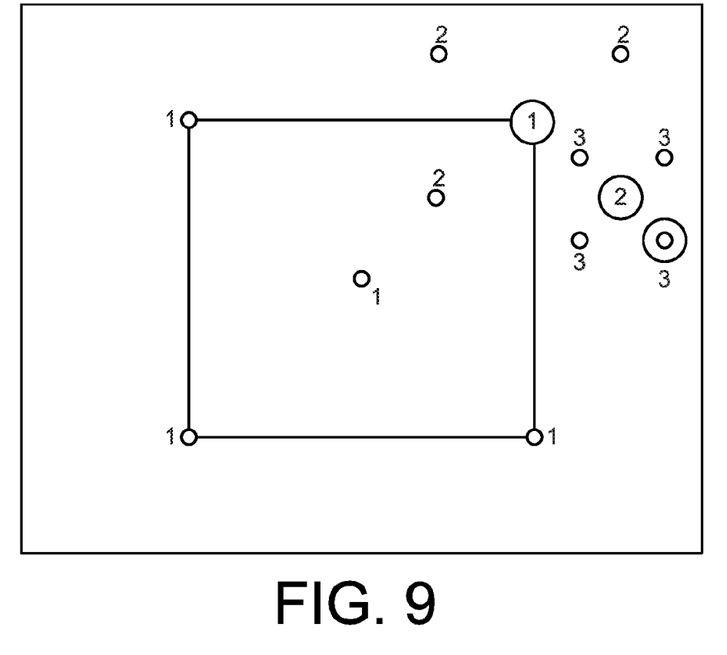

To reduce the computational load further, we investigated the use of two alternative search patterns. These patterns are the 5 plus-shaped and the 5 cross-shaped, which are depicted in FIGS. 8 and 9. Using these patterns with the three-step log search described previously, the detector evaluates four blocks per layer instead of eight blocks. We tested our hierarchical detector using both patterns.

TABLE 2

| Algorithm | Avg. # Max Processed Blocks | Detection Rate |
| --- | --- | --- |
| Hierarchical, 3 layers, 8 nearest neighbor search pattern | 204 | 100.00% |
| Hierarchical, 3 layers, 5 cross-shaped search pattern | 143 | 99.76% |
| Hierarchical, 3 layers, 5 plus-shaped search pattern | 143 | 99.68% |

Table 2 lists the results, which indicate that using any of these patterns produces a detection rate that is slightly lower than the detection rate obtained when the eight nearest neighbor search pattern was used. However, the use of either pattern saves about 29% of the computation, bandwidth, and memory.

Parallel Search System

The hierarchical block based approach described above may be implemented on parallel detector modules. Each of these parallel detector modules may be implemented in software, hardware or a combination of both as described further below. In one implementation, the parallel detector modules operate on different parts of an incoming signal suspected of being watermarked. When one of the detector modules obtains a successful decode, it returns the result of its decoding (e.g., a decoded message payload) and optionally instructs other detector modules to terminate processing on the incoming signal.

In some implementations, such as a server-based parallel detector system, the parallel detector modules can be used to optimize watermark detection processing on large numbers of different incoming suspect signals (e.g., image or audio files, frames of images captured from a camera or camera phone, audio clips, etc). In this case, the parallel detector system quickly analyzes different incoming signals for the presence of digital watermarks and is able to process many more signals in a shorter period of time. For each incoming signal, the parallel detector system quickly evaluates whether a watermark can be extracted from it by concurrently analyzing different parts of the signal. The system quickly identifies marked and un-marked signals, decodes payloads from marked signals, and moves on to analyze different incoming signals. With the addition of more parallel processors, several incoming signals can be evaluated concurrently.

Concurrent processing of the detector can be implemented across hardware elements and software modules (e.g., concurrent software threads or processes in a multi-tasking operating system). In addition, a distributing computing system can be used to distribute several instances of the detector on different processors and/or threads of execution in a distributed computing system. Specific examples include distributing the detecting functions across client device and server systems. For example, a quick pass through each strip may be performed on a client device (e.g., cell phone or PDA), and the zooming in on blocks in selected neighborhoods can be performed on a server (e.g., a server on the Internet).

System Implementation

The detector method described above can be implemented in software, firmware, hardware or combinations of software, firmware, and hardware. In one implementation, the detector system is implemented in an ASIC. In another, it is implemented in an FPGA. In another, it is implemented in a DSP. In another, it is implemented in a native processor of a portable or imaging device, such as a native processor of a PDA, cell phone, camera, scanner, etc. In yet another, it is implemented in software instructions written in a programming language like C, C++, Java, etc. and ported to a processor for a Personal Computer.

The specific implementation depends on the application and target device in which the detector application is going to be used. Preferably, the implementation is adapted to the existing processor or DSP in the target device. However, if the capabilities of the processor or DSP are insufficient for the watermarking application, additional hardware, such as hardware in the form of an ASIC or FPGA can be used to implement parts of the detector that cannot practically be implemented in software/firmware executing on the processor/DSP.

One driving factor in determining what portions to implement in hardware and software/firmware is avoidance of consuming limited processing resources when trying to detect watermarks in un-marked or weakly marked signal portions. As such, one approach is to implement the initial detector process on the initial layer (e.g., the search through the "strip" portion) of the multi-layer hierarchical search in special purpose hardware logic, such as in an ASIC or FPGA. Refinement searches on subsequent layers (e.g., the zooming into blocks in neighborhoods of the second or subsequent hierarchical layers) are implemented in software/firmware of the native processor or DSP of the target device. This enables the hardware to quickly identify parts of signals where successful watermark decoding is likely, and avoids bogging down the processor/DSP with thrashing on un-marked signals.

The detector module, or parts of it, can be implemented on special purpose processors, like the MXP5800 from Intel to take advantage of the image processing functions and parallel processing capabilities of the processor. Similarly, vector processing available on DSPs may also be exploited to perform signal processing functions of the detector more efficiently.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method comprising:
obtaining data representing imagery;
using one or more configured processors, analyzing a first portion of the data to detect a watermark orientation component, said analyzing employing a match filter, in which the match filter yields a correlation value;
upon detection of the watermark orientation component, controlling a convolution decoder to decode a plural-bit watermark payload, in which the convolution decoder produces a correlation strength for each bit of the plural-bit watermark payload;
upon an unsuccessful watermark detection attempt, storing produced correlation strengths as a watermark signature;
for a second portion of the data, using the watermark signature to increase detection of a watermark signal embedded in the second portion.

2. The method of claim 1 further comprising using the correlation value as a watermark strength indicator.

3. The method of claim 2 further comprising collecting watermark strength indicators across portions of the data, and further comprising directing the convolution decoder at a portion of the data meeting a predetermined watermark strength indicator.

4. The method of claim 3 further comprising partitioning the portion of data meeting the predetermined watermark strength indicator into overlapping areas, and searching within the overlapping areas for the plural-bit watermark payload.

5. The method of claim 3 further comprising partitioning the portion of data meeting the predetermined watermark strength indicator into non-overlapping areas, and searching within the non-overlapping areas for the plural-bit watermark payload.

6. The method of claim 1 wherein the data representing imagery comprises image content or video content.

7. The method of claim 1 in which the first portion of data comprises a strip of image data.

8. A method comprising:
obtaining data representing imagery;
using one or more configured processors, analyzing a plurality of portions of the data to detect a watermark orientation component, said analyzing employing a match filter, in which the match filter yields a correlation value for each of the plurality of portions;
determining a first portion from the plurality of portions that comprises a correlation value meeting a predetermined value;
directing a watermark decoder at the first portion to decode a plural-bit watermark payload, in which the watermark decoder produces a watermark signature for the first portion, and in which the watermark decoder searches a plurality of areas at or around the first portion to decode the plural-bit watermark payload.

9. The method of claim 8 in which the watermark decoder comprises a convolutional decoder.

10. The method of claim 9 in which the watermark signature comprises a plurality of decoder weights for each bit of the plural-bit watermark payload.

11. The method of claim 8 in which the plurality of areas comprise overlapping areas at or around the first portion.

12. The method of claim 8 in which the plurality of areas comprise non-overlapping areas at or around the first portion.

13. The method of claim 8 wherein the data representing imagery comprises image content or video content.

14. The method of claim 8 in which the first portion of data comprises a strip of image data.

15. An apparatus comprising:
memory for storing data representing imagery;
one or more configured processors for:
  analyzing a plurality of portions of the data to detect a watermark orientation component, said analyzing employing a match filter, in which the match filter yields a correlation value for each of the plurality of portions;
  determining a first portion from the plurality of portions that comprises a correlation value meeting a predetermined value;
  directing a watermark decoder at the first portion to decode a plural-bit watermark payload, in which the watermark decoder produces a watermark signature for the first portion, and in which the watermark decoder searches a plurality of areas at or around the first portion to decode the plural-bit watermark payload.

16. The apparatus of claim 15 in which the watermark decoder comprises a convolutional decoder.

17. The apparatus of claim 16 in which the watermark signature comprises a plurality of decoder weights for each bit of the plural-bit watermark payload.

18. The apparatus of claim 15 in which the plurality of areas comprise overlapping areas at or around the first portion.

19. The apparatus of claim 15 in which the plurality of areas comprise non-overlapping areas at or around the first portion.

20. The apparatus of claim 15 wherein the data representing imagery comprises image content or video content.

* * * * *